United States Patent

Travis

[15] 3,653,470

[45] Apr. 4, 1972

[54] DISC BRAKE WITH HYDRAULIC AND MECHANICAL ACTUATION AND WEAR ADJUSTMENT MEANS

[72] Inventor: William H. Travis, Union, Ohio
[73] Assignee: General Motors Corporation, Detroit, Mich.
[22] Filed: Sept. 18, 1970
[21] Appl. No.: 73,463

[52] U.S. Cl. ........................ 188/71.9, 188/72.6, 188/106 F, 188/196 F
[51] Int. Cl. ........................................................ F16d 65/56
[58] Field of Search ................ 188/71.9, 72.6, 106 F, 196 F, 188/196 D

[56] References Cited

UNITED STATES PATENTS

| | | | |
|---|---|---|---|
| 3,498,423 | 3/1970 | Belart | 188/196 F |
| 3,543,888 | 12/1970 | Erdmann | 188/71.9 X |
| 3,550,732 | 12/1970 | Beller | 188/71.9 X |

*Primary Examiner*—Duane A. Reger
*Attorney*—W. E. Finken and D. D. McGraw

[57] ABSTRACT

A hydraulically actuable piston is slidable in a first caliper bore and engages a brake shoe assembly. Mechanical actuation is by an adjuster nut slidable in a second caliper bore and threadedly engaging a member which is rotatably received through the wall of the caliper housing so that axial movement is imparted to the adjuster nut and the abutting piston upon rotation of the member. Wear adjustment is through a spring which urges the adjuster nut to advance into retraction limiting engagement with the piston following each hydraulic actuation and a one-way clutch acting between the piston and adjuster nut which permits rotary movement of the adjuster nut in the adjusting direction only.

5 Claims, 3 Drawing Figures

Patented April 4, 1972
3,653,470
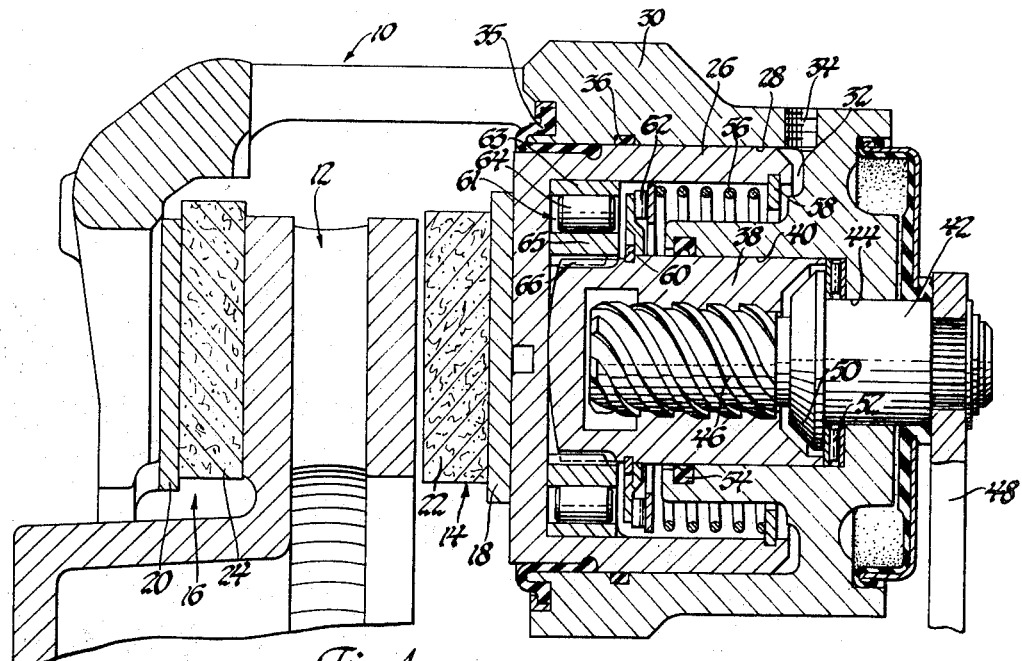
Fig.1
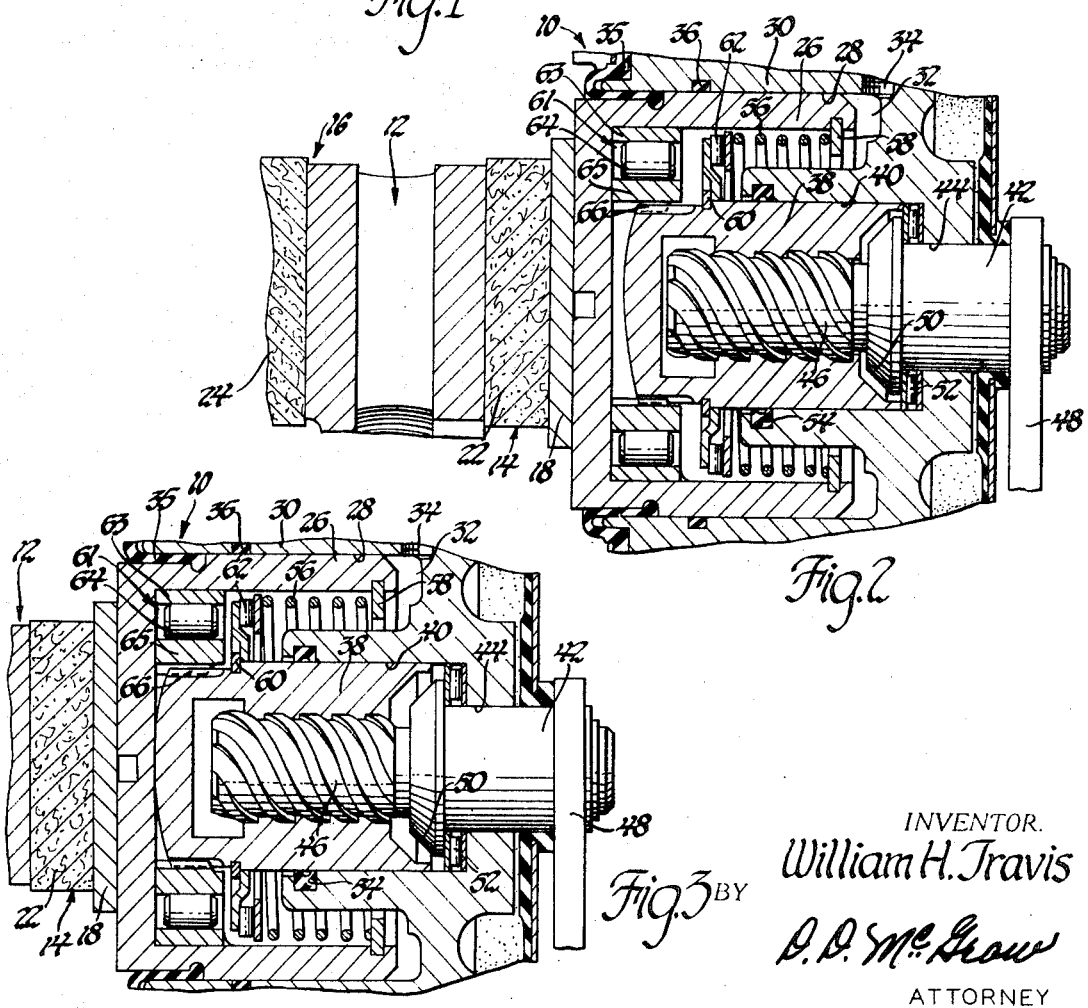
Fig.2
Fig.3
INVENTOR.
William H. Travis
BY
D. D. McGraw
ATTORNEY

DISC BRAKE WITH HYDRAULIC AND MECHANICAL ACTUATION AND WEAR ADJUSTMENT MEANS

The invention relates to a disc brake caliper assembly and more particularly to a combination mechanical and hydraulic actuating means and wear adjustment means for a disc brake caliper.

It is desirable in an automotive disc brake assembly to provide hydraulic brake actuation for service braking and mechanical brake actuation for emergency and parking braking. It is also desirable to provide an automatic wear adjustment mechanism which maintains the brake shoes in close relationship to the disc by preventing excessive knockback of the piston into the caliper when the hydraulic pressure is released so that a minimal amount of the brake shoe travel is required to brake the vehicle.

The disc brake caliper includes a piston slidable in a caliper bore and which upon introduction of pressurized fluid forces an abutting brake pad assembly into braking engagement with the disc. The reaction forces are transferred through the caliper to force the opposing brake shoe assembly into engagement with the other side of the disc. An adjuster nut is located within a second bore formed in the caliper housing and is sealingly slidable therein to operatively engage the piston for mechanical actuation of the brake. The mechanical actuating mechanism includes a member which is rotatably received through the wall of the caliper housing and has a threaded portion which engages a mating threaded portion of the adjuster nut. The member includes a shoulder which engages the caliper housing to prevent axial movement of the member when it is rotated by an operating lever attached to the outer end of the member. The threaded engagement of the rotatable member in the adjuster nut causes the adjuster nut to reciprocate axially within the caliper housing upon rotary movement of the member to actuate the abutting primary piston and brake pad assembly independent of the hydraulic brake system.

The brake adjusts for lining wear following each hydraulic actuation. A spring engages the adjuster nut and urges it to advance toward the piston to hold the piston in close relationship with the disc to prevent excessive knockback of the piston into the caliper. The adjuster nut will not advance toward the piston during hydraulic actuation since the pressure acting on the piston resists the spring. A one-way clutch in connection between the piston and the adjuster nut allows the adjuster nut to rotate on the member in a direction causing axial movement of the adjuster nut toward the piston but prevents the adjuster piston from rotation and consequent axial movement in a retracting direction into the caliper housing at the urging of the hydraulic force applied against the adjuster nut during hydraulic actuation of the brake.

In the drawings:

FIG. 1 is a cross section view of the disc brake caliper assembly showing the caliper in the brake released position;

FIG. 2 is a fragmentary cross section view of the disc brake caliper assembly showing the brake applied hydraulically; and FIG. 3 is a fragmentary cross section view of the disc brake caliper assembly showing the brake applied by the mechanical actuating mechanism.

Referring to FIG. 1, the disc brake assembly includes a caliper assembly 10 and a rotatable disc 12 which is attached to the vehicle wheel assembly. The inner and outer brake shoe assemblies 14 and 16 include backing plates 18 and 20 to which are secured suitable brake linings 22 and 24.

The shoe assemblies 14 and 16 are respectively positioned in the caliper assembly 10 on opposite sides of the disc 12. Piston 26 is slidable in an axially extending bore 28 formed in the caliper housing 30 and forms therewith expansible chamber 32. Inlet port 34 communicates fluid pressure from a master cylinder to the expansible chamber 32. Piston 26 engages the brake shoe assembly 14 so that when chamber 32 is pressurized, that shoe assembly moves into braking engagement with the disc 12 and the reaction force transferred to the caliper housing 30 moves the brake shoe assembly 16 into braking engagement with the other side of the disc 12. Pressure seal 36 and dust seal 35 are provided between the piston 26 and the caliper housing 30.

The auxiliary brake actuating means includes an adjuster nut 38 which is slidable in an axially extending bore 40 formed in caliper housing 30 radially inward of the axially extending bore 28. Rotatable member 42 extends through a bore 44 in caliper housing 30 and includes a threaded portion 46 which engages a mating threaded portion of the adjuster nut 38. Lever 48 is attached to the outer end of rotatable member 42 and is connected to the emergency and parking brake control mechanism. Thrust bearing 52 is located between caliper housing 30 and shoulder 50 of the rotatable member 42 to permit free rotary movement of the rotatable member 42. Adjuster piston 38 engages the piston 26 when the brake is released so that rotary movement of rotatable member 42 imparts axial movement to the adjuster nut 38 and consequent brake applying movement of the piston 26 and abutting brake pad assembly 14. Pressure seal 54 prevents fluid leakage between the caliper housing 30 and adjuster nut 38.

Spring 56 urges adjuster nut 38 to advance toward piston 26 to adjust for wear of the brake shoes. Spring seat 58 engages primary piston 26. Ring 60 engages adjuster piston 38 and locates the annular low friction thrust bearing assembly 62. Spring 56 is seated at spring seat 58 and thrust bearing 62 and acts to urge adjuster nut 38 into engagement with piston 26.

A one-way clutch 61, illustrated as being of the ramp and roller type, acts between adjuster nut 38 and piston 26 and includes outer ring 63 which is pressed into piston 26, rollers 64, and inner ring 65 which has a splined connection 66 with the adjuster nut 38. The splined connection 66 permits reciprocal axial movement of piston 26 as required for hydraulic actuation of the brake. The one-way clutch assembly 61 prevents the adjuster nut 38 from rotating on the threaded portion 46 of rotatable member 42 in a direction causing axial retracting movement of the adjuster nut 38 into the caliper housing 30.

OPERATION

When the brakes are hydraulically applied, as shown in FIG. 2, pressurized fluid enters the expansible chamber 32 through inlet port 34 and displaces primary piston 26 out of caliper housing 30. Splined connection 66 between the one-way clutch assembly and the adjuster nut 38 permits free reciprocal axial movement of the piston 26 to actuate and release the brake. The one-way clutch 61 prevents the hydraulic pressure acting against the adjuster nut 38 from rotating the adjuster nut 38 on threaded portion 46 of rotatable member 42 in a direction causing movement of the adjuster nut 38 away from piston 26. The hydraulic actuating pressure acting against the adjuster nut 38 will not allow it to advance toward piston 26 at the urging of spring 56.

If brake lining wear has occurred during the hydraulic brake actuation, the piston 26 will not retract to its original position in the caliper housing 30 when the pressure is released. When the expansible chamber 32 has been sufficiently depressurized, the spring 56 acts through the low friction thrust bearing assembly 62 to turn adjuster nut 38 on the mating threads 46 of the rotatable member 42 moving adjuster nut 38 axially into engagement with the piston 26. The one-way clutch 61 allows the adjuster nut 38 to rotate in this direction. Subsequent to this adjusting movement of adjuster nut 38, the piston 26 cannot be knocked back into the caliper since the one-way clutch 61 will not allow adjuster nut 38 to rotate in the retracting direction. It is essential to the operation of the adjuster that the force required to move piston 26 axially be greater than that required to move adjuster nut 38 so that spring 56 will advance the adjuster nut 38 rather than retract the piston 26. Low friction thrust bearing assembly 62 permits the adjuster nut 38 to rotate without resistance from the adjuster spring 56. It is noted that since operation of the wear adjuster is independent of movement of member 42 and in fact depends upon the member 42 being stationary, the present invention discloses an improved disc brake adjuster wherein a threaded member is nonrotatably attached to the caliper and engages an adjuster nut.

Referring to FIG. 3, the brake is shown applied by the auxiliary mechanical actuating mechanism. Rotation of the rotatable member 42 by force applied to the lever 48 causes adjuster nut 38 to advance axially and acts through the abutting piston 26 to force the brake pad assembly 14 into engagement of the disc 12. The one-way clutch 61 guarantees that the adjuster nut 38 will not rotate with the rotatable member 42.

Thus a disc brake caliper assembly having hydraulic and mechanical actuating means and automatic wear adjustment is provided.

What is claimed is:

1. Self-adjusting means for a disc brake assembly having a disc and a brake shoe assembly and comprising:
   a housing having first and second axially extending bores therein;
   a piston sealingly slidable in said first bore and engaging said brake pad assembly, said first piston advanceable to carry said brake pad assembly into engagement with said disc to provide braking torque and retractable to release said braking torque;
   an adjuster nut sealingly movable in said second bore and engageable with said first piston to limit said retractable movement thereof, said adjuster nut being advanceable toward said piston to further limit said retractable movement to adjust for wear of said brake shoe assembly;
   means attached to said housing and threadedly engaging said adjuster nut;
   spring means continuously urging movement of said adjuster nut to an adjusted position in closer relationship to said disc;
   one-way clutch means acting between said piston and said adjuster nut, said one-way clutch means allowing rotation and consequent axial movement of said adjuster nut toward said piston and preventing rotation and consequent axial movement away from said piston to hold said piston at the said adjusted position;
   means in connection between said one-way clutch means and one of said aforementioned adjuster nut and piston to permit only axial movement therebetween;
   and means communicating pressurized fluid to said expansible chamber to provide service actuation, said pressurized fluid acting on said adjuster nut to prevent movement of said adjuster nut toward said piston during said service actuation.

2. A combination service actuating means, auxiliary actuating means and self-adjusting means for a disc brake assembly having a disc and a brake shoe assembly and comprising;
   a housing having first and second axially extending bores therein;
   a piston sealingly slidable in said first bore and engaging said brake pad assembly, said piston advanceable to carry said brake pad assembly into engagement with said disc to provide braking torque and retractable to release said braking torque;
   an adjuster nut sealingly movable in said second bore and engageable with said first piston to limit said retractable movement thereof, said adjuster nut being advanceable toward said piston to further limit said retractable movement to adjust for wear of said brake shoe assembly;
   means associated with said housing and threadedly engaging said adjuster nut to impart axial movement to said adjuster nut upon rotary movement of said associated means whereby said piston engaging said adjuster nut moves axially to carry said brake pad assembly into engagement of said disc to provide said auxiliary actuation;
   spring means continuously urging movement of said adjuster nut to an adjusted position in closer relationship to said disc;
   one-way clutch means acting between said piston and said adjuster nut, said one-way clutch means allowing rotation and consequent axial movement of said adjuster nut toward said piston and preventing rotation and consequent axial movement away from said piston to hold said piston at said adjusted position;
   means in connection between said one-way clutch means and one of said aforementioned adjuster nut and piston to permit only axial movement therebetween;
   and means communicating pressurized fluid to said expansible chamber to provide said service actuation, said pressurized fluid acting on said adjuster nut to prevent movement of said adjuster nut toward said piston during said service actuation.

3. The brake assembly of claim 2 further characterized by said means associated with said housing including a member having a portion thereof rotatably received through the wall of said housing, a threaded portion engaging a mating threaded portion of said adjuster nut, a shoulder intermediate said threaded portion and said rotatably received portion and engaging said housing to prevent axial movement of said member, and means for rotating said member to impart axial movement to said adjuster nut.

4. The brake assembly of claim 2 further characterized by said spring means acting between said piston and said adjuster nut and having low friction thrust bearing means in connection therebetween to permit relatively free rotary movement of said adjuster nut.

5. The brake assembly of claim 3 further characterized by low friction thrust bearing means in connection between said shoulder of said member and said housing to permit relatively free rotary movement of said member.

* * * * *